United States Patent
Ha (10) Patent No.: US 10,867,048 B2
(45) Date of Patent: *Dec. 15, 2020

(54) DYNAMIC SECURITY MODULE SERVER DEVICE AND METHOD OF OPERATING SAME

(71) Applicants: EVERSPIN CORP., Seoul (KR); Young Bin Ha, Seoul (KR)

(72) Inventor: Young Bin Ha, Seoul (KR)

(73) Assignee: EVERSPIN CORP., Seoul (KR)

(*) Notice: Subject to any disclaimer, the term of this patent is extended or adjusted under 35 U.S.C. 154(b) by 110 days.

This patent is subject to a terminal disclaimer.

(21) Appl. No.: 15/701,726

(22) Filed: Sep. 12, 2017

(65) Prior Publication Data
US 2018/0007082 A1    Jan. 4, 2018

Related U.S. Application Data

(63) Continuation of application No. PCT/KR2016/002535, filed on Mar. 14, 2016.

(30) Foreign Application Priority Data

Mar. 13, 2015  (KR) .................. 10-2015-0035177
Mar. 14, 2016  (KR) .................. 10-2016-0030568

(51) Int. Cl.
G06F 21/57      (2013.01)
G06F 21/51      (2013.01)
(Continued)

(52) U.S. Cl.
CPC ............ G06F 21/577 (2013.01); G06F 21/14 (2013.01); G06F 21/50 (2013.01); G06F 21/51 (2013.01);
(Continued)

(58) Field of Classification Search
CPC .... G06F 21/577; G06F 21/567; G06F 21/566; G06F 21/554; G06F 21/14; G06F 21/54;
(Continued)

(56) References Cited

U.S. PATENT DOCUMENTS 5,708,709 A *  1/1998  Rose .................. G06F 8/61
                                                    380/30
7,254,586 B2 * 8/2007  Chen .................. G06F 21/14
                                                707/999.001
(Continued)

FOREIGN PATENT DOCUMENTS

KR    10-2003-0003593 A    1/2003
KR    10-2013-0101657 A    9/2013
(Continued)

*Primary Examiner* — Meng Li
(74) *Attorney, Agent, or Firm* — Nelson Mullins Riley & Scarborough LLP; Kongsik Kim, Esq.

(57) ABSTRACT

Disclosed herein are a dynamic security module server device for transmitting a dynamic security module to a user terminal and receiving a security management event from the user terminal, and a method of operating the dynamic security module server device. The dynamic security module server device includes a communication unit configured to transmit and receive a security management event over a network, and a processor configured to control the communication unit. The processor is configured to create a security session with the security client of a user terminal, and to transmit a dynamic security module to the security client of the user terminal so that part or all of code performing security management in the security client of the user terminal in which the security session has been created has a predetermined valid period.

17 Claims, 6 Drawing Sheets

(51) Int. Cl.

| | | |
|---|---|---|
| *G06F 21/52* | (2013.01) | |
| *G06F 21/50* | (2013.01) | |
| *H04L 29/08* | (2006.01) | |
| *G06F 21/56* | (2013.01) | |
| *G06F 21/14* | (2013.01) | |
| *G06F 21/55* | (2013.01) | |
| *H04L 29/06* | (2006.01) | |
| *G06F 21/54* | (2013.01) | |

(52) U.S. Cl.
CPC .............. *G06F 21/52* (2013.01); *G06F 21/54* (2013.01); *G06F 21/554* (2013.01); *G06F 21/566* (2013.01); *G06F 21/567* (2013.01); *G06F 21/57* (2013.01); *H04L 63/1425* (2013.01); *H04L 63/1433* (2013.01); *H04L 63/1441* (2013.01); *H04L 67/141* (2013.01); *H04L 67/146* (2013.01); *G06F 2221/033* (2013.01); *G06F 2221/2137* (2013.01); *H04L 63/20* (2013.01); *H04L 67/14* (2013.01)

(58) Field of Classification Search
CPC .......... G06F 21/57; G06F 21/52; G06F 21/51; G06F 21/50; G06F 2221/2137; G06F 2221/033; H04L 67/141; H04L 67/146; H04L 63/1425; H04L 63/1441; H04L 63/1433; H04L 67/14; H04L 63/20
See application file for complete search history.

(56) References Cited

U.S. PATENT DOCUMENTS

| | | | |
|---|---|---|---|
| 9,087,189 B1* | 7/2015 | Koeten | ................... H04L 67/10 |
| 2004/0103323 A1* | 5/2004 | Dominic | ............... H04L 63/126 |
| | | | 726/4 |
| 2007/0067301 A1* | 3/2007 | Malik | ................. G06F 21/6218 |
| 2007/0101405 A1* | 5/2007 | Engle | ................. H04L 63/0272 |
| | | | 726/4 |
| 2008/0052766 A1* | 2/2008 | Esperet | ............... H04L 63/0272 |
| | | | 726/3 |
| 2014/0283038 A1* | 9/2014 | Call | ................... H04L 63/1441 |
| | | | 726/22 |

FOREIGN PATENT DOCUMENTS

| | | |
|---|---|---|
| KR | 10-2013-0134946 A | 12/2013 |
| KR | 10-2014-0023098 A | 2/2014 |
| KR | 10-2014-0071744 A | 6/2014 |
| KR | 10-2014-0127987 A | 11/2014 |

* cited by examiner

| session_id | param1 | param2 | param3 | state1 | state2 |
|---|---|---|---|---|---|
| 11836381 | A | B | C | 1 | 2 |
| 72365784 | B | B | A | 0 | 3 |
| 87656501 | C | A | C | 3 | 2 |

DYNAMIC SECURITY MODULE SERVER DEVICE AND METHOD OF OPERATING SAME

CROSS-REFERENCE TO RELATED APPLICATION

This application is a continuation of PCT/KR2016/002535 filed on Mar. 14, 2016, which claims priority to Korean Patent Application Nos. 10-2015-0035177 and 10-2016-0030568 filed on Mar. 13, 2015 and Mar. 14, 2016, respectively, which applications are incorporated herein by reference.

TECHNICAL FIELD

The present invention relates to a dynamic security module server device and a method of operating the same, and more specifically to a dynamic security module server device and a method of operating the same, in which dynamic security modules in each of which part or all of the code performing security management has a predetermined valid period are transmitted to the security client of a user terminal, and security modules for various types of application programs of the user terminal are allowed to be frequently changed, thereby making the hacking of the application programs difficult and thus significantly improving the security of the user terminal.

BACKGROUND ART

Recently, smartphones, which are mobile terminals, have become necessities essential for the life of today, and have been widely popularized all over the world. However, as the security vulnerability of smartphones has been continuously revealed, attacks via malicious applications have been rapidly increasing.

Hackers develop malicious applications for mobile terminals, insert malware into the malicious applications, and distribute the malicious applications disguised as normal applications to general users via open markets or the Internet. When a malicious application is installed on a mobile terminal, the malicious application inside the mobile terminal may attempt an attack for leaking not only personal information, such as Short Message Service (SMS) transmission and reception information, a telephone directory, Internet access records, etc., but also financial information, such as a mobile accredited certificate used for mobile banking, etc., to an external server without the knowledge of a user.

When an application is executed, most application security solutions invoke security logic and respond with results while communicating with the security module of the application. However, when communication with the security module is forcibly blocked or the security module is disarmed by an altered application by an attack of a hacker, fatal vulnerability related to personal information and financial information occurs.

Therefore, there is an urgent demand for the development of technology which can overcome a security vulnerability problem in a mobile terminal-based user environment widely popularized recently both locally and internationally and which can improve the security of various types of software included in user terminals.

SUMMARY OF THE DISCLOSURE

Accordingly, the present invention has been made to overcome the above-described problems of the prior art, and an object of the present invention is to provide a dynamic security module server device and a method of operating the same, in which dynamic security modules in each of which part or all of the code performing security management has a predetermined valid period are transmitted to the security client of a user terminal, and security modules for various types of application programs of the user terminal are allowed to be frequently changed, thereby making the hacking of the application programs difficult and thus significantly improving the security of the user terminal.

According to an aspect of the present invention, there is provided a dynamic security module server device for transmitting a dynamic security module to a user terminal and receiving a security management event from the user terminal, the dynamic security module server device including: a communication unit configured to transmit and receive a security management event over a network; and a processor configured to control the communication unit; wherein the processor is configured to: create a security session with the security client of a user terminal; and transmit a dynamic security module to the security client of the user terminal so that part or all of code performing security management in the security client of the user terminal in which the security session has been created has a predetermined valid period.

The processor may be further configured to: receive security management results from the dynamic security module transmitted to the security client; examine the received security management results; and transmit a security management examination result value to the dynamic security module of the security client.

The processor may be further configured to transmit a stop command to stop the running of an application program of the user terminal to the dynamic security module of the security client when a security problem has occurred in the user terminal.

The processor may be configured to create the security session by generating and storing a session ID as a security session ID and then transmitting the session ID to the security client so that the security client stores the session ID.

The security session may be created with the security client of the user terminal which has been authenticated.

The predetermined valid period may be configured to delete the part or all of the code or block the use of the part or all of the code when the predetermined valid period expires.

The processor may be further configured to store parameters of the dynamic security module transmitted to the security client while the security session is being maintained.

The processor may be further configured to verify whether details transmitted from the security client are identical to the configuration of the parameter of the dynamic security modules.

The dynamic security module server device may further include storage configured to store the dynamic security module to be transmitted to the security client of the user terminal, the session ID to be used as the security session ID, and the parameters of the dynamic security module.

The processor may be further configured to transmit a verification token proving that the dynamic security module has normally operated to the application program management server of the user terminal.

According to another aspect of the present invention, there is provided a method of operating a dynamic security module server device for transmitting a dynamic security module to a user terminal and receiving a security management event from the user terminal, the method including: creating a security session with the security client of a user terminal; and transmitting a dynamic security module to the security client of the user terminal so that part or all of code performing security management in the security client of the user terminal in which the security session has been created has a predetermined valid period.

The method may further include: receiving security management results from the dynamic security module transmitted to the security client; examining the received security management results; and transmitting a security management examination result value to the dynamic security module of the security client.

The method may further include transmitting a stop command to stop the running of an application program of the user terminal to the dynamic security module of the security client when a security problem has occurred in the user terminal.

The security session may be created by generating and storing a session ID as a security session ID and then transmitting the session ID to the security client so that the security client stores the session ID. The method may further include storing parameters of the dynamic security module transmitted to the security client while the security session is being maintained.

According to still another aspect of the present invention, there is provided a computer-readable storage medium having stored thereon a computer program that, when executed by a processor, causes the processor to execute the method.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Embodiments of the present invention will be described in detail with reference to the accompanying drawings. In the following description of the present invention, when it is determined that a detailed description of a related well-known component or function may unnecessarily make the gist of the present invention obscure, it will be omitted.

Furthermore, in the following description of the embodiments of the present invention, a specific numerical value is merely an embodiment.

Figure 1:
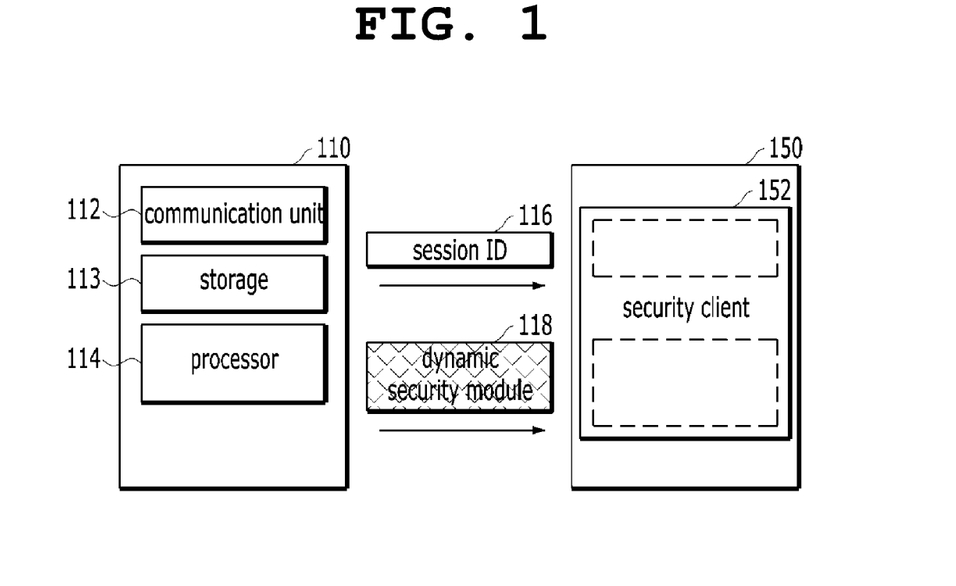
FIG. 1 is a block diagram showing the schematic configuration of a dynamic security module server device according to an embodiment of the present invention.
Figure 2:
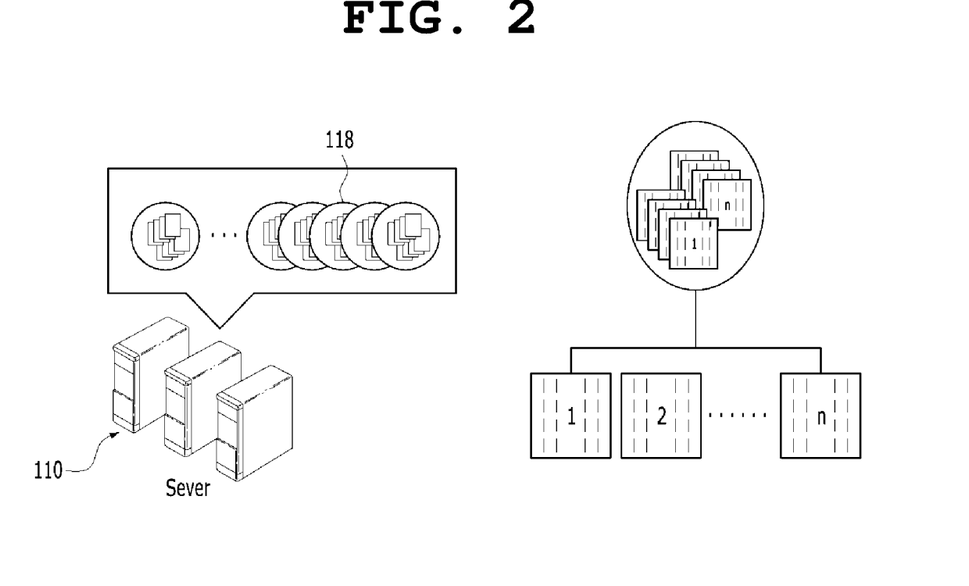
FIG. 2 is a schematic diagram showing the operation of storing dynamic security modules in the dynamic security module server device according to the embodiment of the present invention.
Figure 3:
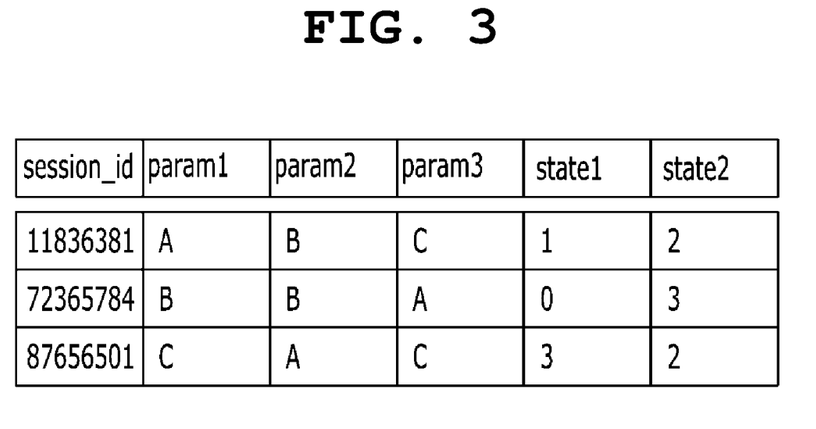
FIG. 3 is a schematic diagram showing an example of the generation of session IDs and dynamic security module parameters in the dynamic security module server device according to the embodiment of the present invention.

FIG. 1 is a block diagram showing the schematic configuration of a dynamic security module server device 110 according to an embodiment of the present invention, FIG. 2 is a schematic diagram showing the operation of storing dynamic security modules in the dynamic security module server device 110 according to the present embodiment, and FIG. 3 is a schematic diagram showing an example of the generation of session IDs and dynamic security module parameters in the dynamic security module server device 110 according to the present embodiment.

Referring to these drawings, the dynamic security module server device 110 according to the present embodiment is a dynamic security module server device which transmits a dynamic security module 118 to a user terminal 150 and which receives a security management event from the user terminal 150. The dynamic security module server device 110 includes a communication unit 112 configured to transmit and receive a security management event over a network, and a processor 114 configured to control the communication unit 112. The processor 114 is configured to create a security session with the security client 152 of the user terminal 150, and to transmit the dynamic security module 118 to the security client 152 of the user terminal 150 so that part or all of the code performing security management in the security client 152 of the user terminal 150 in which the security session has been created has a predetermine valid period.

In other words, in the dynamic security module server device 110 according to the present embodiment, the processor 114 is configured to: store dynamic security modules 118 in each of which part or all of the code performing security management in the security client 152 of the user terminal 150 has a predetermined valid period, or generate dynamic security modules 118 upon transmission; create a security session with the security client 152 of the user terminal 150 in each of various cases, such as in the case where the user terminal 150 operates, in the case where an application program including the security client 152 runs on the user terminal 150, in the case of a user request from the user terminal 150, at a predetermined period set in the dynamic security module server device 110, at a predetermined period set in the user terminal 150, etc.; and transmit the dynamic security modules 118 to the security client 152 of the user terminal 150. Accordingly, the dynamic security modules 118 are allowed to be frequently updated, thereby effectively preventing a security problem from occurring in application programs installed on the user terminal due to the hacking of the security module, computer virus infection, or the like.

Furthermore, rather than repeatedly transmitting the same type of dynamic security module to the security client 152, the processor 114 may store at least two dynamic security modules having different code structures or algorithms, varying in one or more variable portions selected from the group consisting of, for example, the function name of code for performing security management, a variable designating an algorithm to be executed, a protocol field, a variable designating a protocol sequence, a variable designating a compile level, and a variable designating an executable code obfuscation method, in the processor 114, and may select and transmit a different dynamic security module 118 upon each transmission to the security client 152.

Furthermore, the predetermined valid period of the part or all of the code of the dynamic security module 118 performing the security management may be set to a time interval selected from the group consisting of, for example, one hour, three hours, six hours, nine hours, 12 hours, 24 hours, 48 hours, and 72 hours. When the set period expires, the function of the part or all of the code of the dynamic security module 118 may be stopped. Accordingly, when the predetermined valid period of the dynamic security module 118 expires, the security client 152 may stop the use of the dynamic security module 118, may receive a new dynamic security module 118 from the dynamic security module server device 110, and may perform update, thereby effectively preventing a security problem from occurring in the user terminal 150 due to the hacking of the dynamic security module 118 or computer virus infection.

In this case, the security management is a concept including overall management which is performed by the dynamic security module 118 for the purpose of the security of the user terminal 150, such as: detecting whether an element which may be a hacking threat to the application program including the security client 152 is present; detecting hacking threat elements, including the forgery or alteration of the O/S of the terminal on which the application program has been installed, the forgery or alteration of an app, rooting, debugger and root process execution histories, the installation of a malicious application, a malicious application execution history, a malicious port, the forgery or alteration of a session, the forgery or alteration of an input value, and a computer virus; transmitting information about the hacking threat elements to the dynamic security module server device 110; treating a computer virus related to the application program; transmitting a stop command to stop the running of the application program in order to prevent a hacking threat and a computer virus infection problem from occurring in the application program; stopping the function of the dynamic security module 118 itself due to a problem, such as the expiration of the predetermined valid period of the dynamic security module 118, the hacking of a hacker, computer virus infection, or the like; etc.

Furthermore, the security management event received from the user terminal 150 may be one of various events, such as details used to determine the parameters of the dynamic security module 118 transmitted from the security client 152, the details of the states in which the dynamic security module 118 runs, security management result information indicating that there has been a hacking threat, the details of treatment of computer viruses for an application program installed on the user terminal 150, etc.

Furthermore, the user terminal 150 may be one of various terminals requiring security, such as a smartphone, a tablet PC, a desktop computer, a notebook computer, etc.

The processor 114 may generate control signals and control the server device 110 including the communication unit 112 and storage 113. In this case, the communication unit 112 may exchange data with an external device through communication using various protocols, and may connect with an external network via a wired or wireless connection and transmit and receive digital data, such as content, an application, etc.

Furthermore, the storage 113 is a device capable of storing various types of digital data including an audio, a photo, a moving image, an application, etc. The storage 113 refers to one of various types of digital data storage spaces, such as flash memory, Random Access Memory (RAM), Solid State Drive (SSD), etc. The storage 113 may temporarily store data received from an external device via the communication unit 112.

The processor 114 may be further configured to receive security management results from the dynamic security module 118 transmitted to the security client 152, to examine the received security management results, and to transmit a security management examination result value to the dynamic security module 118 of the security client 152.

In this case, the security management results are the details of security management which has been actually performed by the dynamic security module 118 in the security client 152. The security management results are the result values of the performance of detailed security management functions included in the dynamic security module 118, and are part of a security management event. For example, the security management results may be the details of the result of the detection of the presence or absence of an element which may be a hacking threat, the result of the detection of an element which may be a hacking threat, the result of the treatment of a computer virus for an application program, the result of the removal of an element which may be a hacking threat, etc.

Furthermore, the security management examination result value is a determination result obtained when the dynamic security module server device 110 receives the security management results and analyzes whether a security problem has occurred in the user terminal 150 based on the security management results. In other words, the security management examination result value may be the result of the determination of whether an element which may be a current hacking threat to the user terminal 150 is present, the result of the determination whether an application program installed on the user terminal 150 has been hacked, or the result of the determination of whether an application program has been infected with a computer virus or malware.

More specifically, the processor 114 may be further configured to receive security management results from the dynamic security module 118 transmitted to the security client 152 as the security management, to examine the received security management results, and to, when a security problem has not occurred in the user terminal 150, transmit a security diagnosis examination result value indicating that a security problem has not occurred to the dynamic security module 118 of the security client 152.

Furthermore, the processor 114 may be further configured to receive security management results from the dynamic security module 118 transmitted to the security client 152 as the security management, to examine the received security management results, and to, when a security problem has occurred in the user terminal 150, transmit a security management examination result value indicating that a security problem has occurred to the dynamic security module 118 of the security client 152.

In other words, the dynamic security module server device 110 according to the present embodiment may be configured to receive security management results from the dynamic security module 118 transmitted to the security client 152 of the user terminal 150, to examine the received security management results, and to, in turn, transmit a management examination result value to the dynamic security module 118, thereby enabling the dynamic security module 118 to rapidly and effectively deal with a situation in which a security problem has occurred in the user terminal 150.

In connection with this, the processor 114 may be further configured to receive security management results from the dynamic security module 118 transmitted to the security client 152 as the security management, to examine the received security management results, and to, when a security problem has occurred in the user terminal 150, transmit a stop command to stop the running of an application program of the user terminal 150 to the dynamic security module 118 of the security client 152 and discard a security session with the security client 152, thereby fundamentally preventing the problem in which a hacker hacks the dynamic security module 118 and causes a security problem regarding various application programs of the user terminal 150.

In other words, when a security problem has occurred in the user terminal 150, the running of an application program installed on the user terminal 150 is rapidly stopped. As a result, the security problem can be prevented from being additionally spread to other application programs installed on the user terminal 150 by the running of the former application program, and the tracking and analysis of the dynamic security module 118 or dynamic security module server device 110 by a hacker can be rapidly blocked by discarding a security session.

Meanwhile, the processor 114 may create the security session by generating and storing a session ID 116 as a security session ID and transmitting the session ID 116 to the security client 152 so that the security client 152 can store the session ID 116. This method of creating a security session using a session ID has the advantage of creating a plurality of security sessions and frequently updating the security sessions, thereby improving the reliability and convenience of the security management of the dynamic security module 118 for the user terminal 150.

In this case, the security session may be created with the security client 152 of an authenticated user terminal. In other words, the creation of the security session may include the authentication of the security client 152 of the user terminal 150 for the transmission of the dynamic security module 118 in order to further improve the security of the user terminal.

Furthermore, the authentication of the security client 152 of the user terminal 150 may be completed, for example, at the same time that an application, i.e., the application program including the security client 152, is installed on the user terminal 150, when an application is first run after being installed on the user terminal 150, upon logging in to or logging out of an application, or in response to a request from a user via an application after the application has been installed on the user terminal 150.

The predetermined valid period may be configured to delete the part or all of the code or block the use of the part or all of the code when the predetermined valid period expires. In other words, the dynamic security module 118 in which part or all of the code performing security management in the security client 152 of the user terminal 150 has a predetermined valid period may be configured to delete the part or all of the code or stop the use of itself not to perform security management when the predetermined valid period expires.

Accordingly, when the predetermined valid period of the dynamic security module 118 expires, the security client 152 may update part or all of code constituting the dynamic security module 118, thereby fundamentally preventing a security problem from occurring due to a cause, such as the hacking of the dynamic security module 118, infection with a computer virus, or the like.

Furthermore, the processor 114 may be further configured to store parameters regarding the dynamic security module 118 transmitted to the security client 152 while the security session is being maintained.

In this case, the parameters regarding the dynamic security module 118 is specific information about the function name of code adapted to perform the security management of the dynamic security module transmitted to the security client 152 and performing security management, a variable adapted to designate an algorithm to be executed, a protocol field, a variable adapted to designate a protocol sequence, a variable adapted to designate a compile level, a variable adapted to designate an executable code obfuscation method, etc. The parameters regarding the dynamic security module 118 are intended to distinguish individual dynamic security modules which are frequently updated and have different configurations, and are determined by the dynamic security module server device 110. The parameters regarding the dynamic security module 118 are information when the code adapted to perform the security management of the dynamic security module 118 is executed.

Furthermore, the processor 114 may be further configured to receive details regarding dynamic security modules 118 transmitted to the security client 152 and to verify whether the details are the same as the configurations of the stored parameters of the dynamic security modules 118. In the verification of changes in the parameters of the dynamic security modules, when it is determined that the sequentially transmitted parameters of the dynamic security modules, for example, A-B-C-D, are different from details transmitted from the security client 152 through comparison therebetween, it may be inferred that there has been a hacking attempt of a hacker or the like, and countermeasures against this may be taken.

Figure 4:
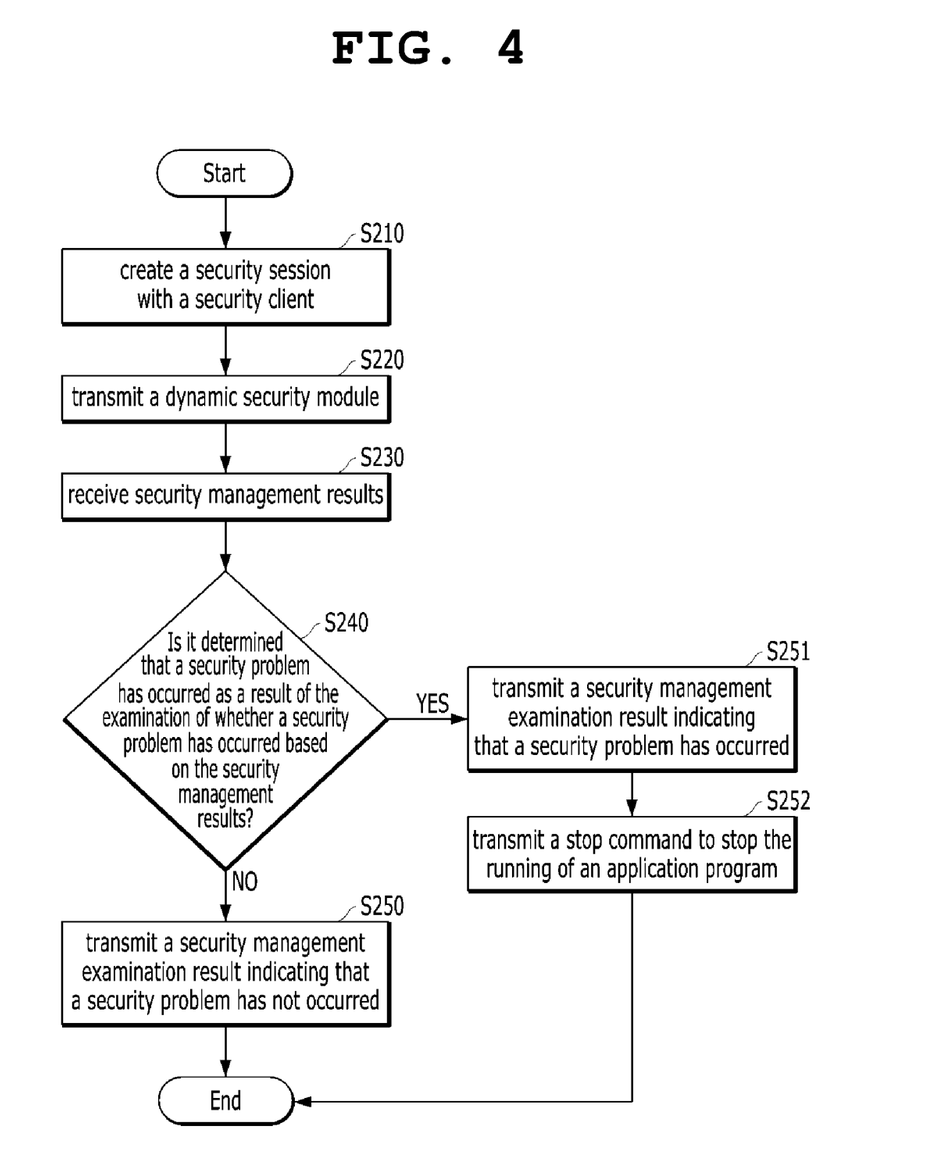
FIG. 4 is a flowchart showing a method of operating a dynamic security module server device according to a first embodiment of the present invention.

More specifically, as shown in FIG. 4, when the dynamic security module server device 110 and the security client 152 of the user terminal 150 have created a security session by generating 11836381 as a session ID, it may be verified whether details regarding the dynamic security module 118 transmitted from the security client 152 are parameters A, B, and C and states 1, and 2. When the dynamic security module server device 110 and the security client 152 of the user terminal 150 have created a security session by generating 72365784 as a session ID, it may be verified whether details regarding the dynamic security module 118 transmitted from the security client 152 are parameters C, B, and A and states 0, and 3. Furthermore, When the dynamic security module server device 110 and the security client 152 of the user terminal 150 have created a security session by generating 87656501 as a session ID, it may be verified whether details regarding the dynamic security module 118 transmitted from the security client 152 are parameters B, A, and C and states 3, and 2. In this case, the details of the parameters and the states may be security management events received from the user terminal 150.

The security management may be configured to store the protocol fields and protocol sequences of individual dynamic security modules 118 transmitted to the security client 152, to receive the protocol field and protocol sequences of the dynamic security modules 118 in the security client 152, and to perform verification by comparing the stored protocol field and protocol sequences with the received protocol field and protocol sequences.

In other words, the security management may be configured to receive and analyze the protocol fields and protocol sequences of the dynamic security modules 118 transmitted to the security client 152, thereby inferring that an attempt to perform hacking has been made by a hacker, for example, when at least one error has occurred during the performance of a protocol. Accordingly, based on the results of the analysis of the protocol fields and protocol sequences of the dynamic security modules 118, a hacking risk or the possibility of the occurrence of a security problem may be predicted, and countermeasures may be taken to prevent a security problem from occurring.

In this case, the protocol field is a protocol for performance methods, etc. regarding various items of the security management which is performed by the dynamic security module 118 in the security client 152. For example, the protocol field may be a communication protocol adapted to transmit the result of the determination of whether an element which may be a hacking threat to an application program including the security client 152 is present, or a communication protocol adapted to transmit the details of the self-treatment of a file computer virus for the application program, a file boot & file computer virus, and/or the like. Furthermore, the protocol sequence refers to the performance sequence of various items including the security management which is performed by the dynamic security module 118 in the security client 152. For example, the protocol sequence is the sequence of the detection of hacking threat elements, including the forgery or alteration of the O/S of the terminal on which an application program has been installed, the forgery or alteration of an app, rooting, a debugger, a root process execution history, the installation of a malicious application, a malicious application execution history, a malicious port, the forgery or alteration of a session, the forgery or alteration of an input value, and a computer virus.

The dynamic security module server device 110 may further include the storage 113 configured to store a dynamic security module 118 to be transmitted to the security client 152 of the user terminal 150, a session ID 116 to be used as a security session ID, and the parameters of the dynamic security module.

In other words, the dynamic security module server device 110 stores the dynamic security module 118 and the session ID 116 in the storage 113, thereby enabling the dynamic security module 118 and the session ID 116 to be smoothly and stably transmitted to the security client 152. Furthermore, the parameters regarding the dynamic security module to be transmitted to the security client 152 are stored in the storage 113, thereby enabling the verification of identity with the details of the reception of the dynamic security module 118 to be transmitted to the security client 152 to be more stably performed.

The processor 114 may be further configured to transmit a verification token proving that the dynamic security module 118 has normally operated to the application program management server of the user terminal 150.

More specifically, the processor 114 examines the security management results received from the dynamic security module 118, and, when a security problem has not occurred in the user terminal 150, includes a verification token proving that the security management examination result value has not circumvented the security client 152 in the security management examination result value, and transmits the security management examination result value to the dynamic security module 118. The dynamic security module 118 transmits the verification token to the management server (not shown) of the application program including the security client 152. The management server, in turn, transmits the verification token to the processor 114 of the dynamic security module server device 110, thereby allowing the process of verifying whether the verification token is valid to be further performed.

In other words, the dynamic security module server device 110 adds the verification token for the security management examination result value to the security management examination result value, and transmits the security management examination result value and the verification token to the dynamic security module 118. The dynamic security module 118 transmits the verification token to the management server (not shown) of the application program including the security client 152. Accordingly, the management server of the application program is allowed to verify whether the security management examination result value has not been forged or altered and is thus valid via the verification token, thereby further improving the reliability of the security management examination result value.

In this case, the dynamic security module server device 110 and the management server of the application program may be integrated into a single serve or may be separated into respectively servers and disposed in separate places depending on the system design of the dynamic security module server device.

Figure 5:
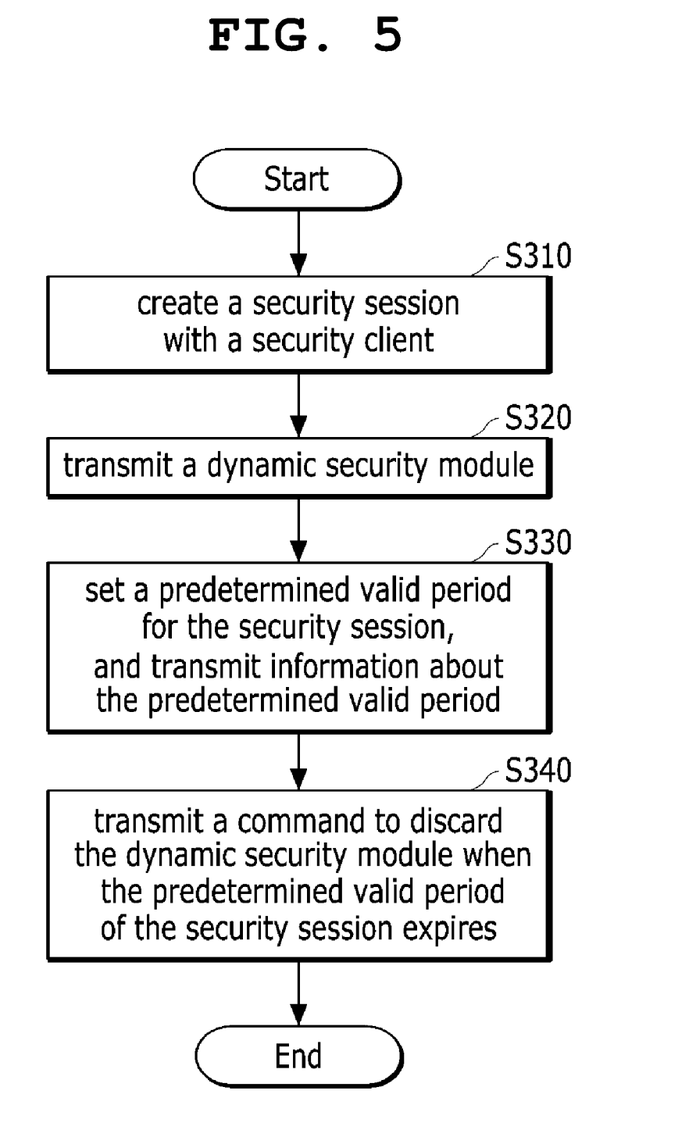
FIG. 5 is a flowchart showing a method of operating a dynamic security module server device according to a second embodiment of the present invention.
Figure 6:
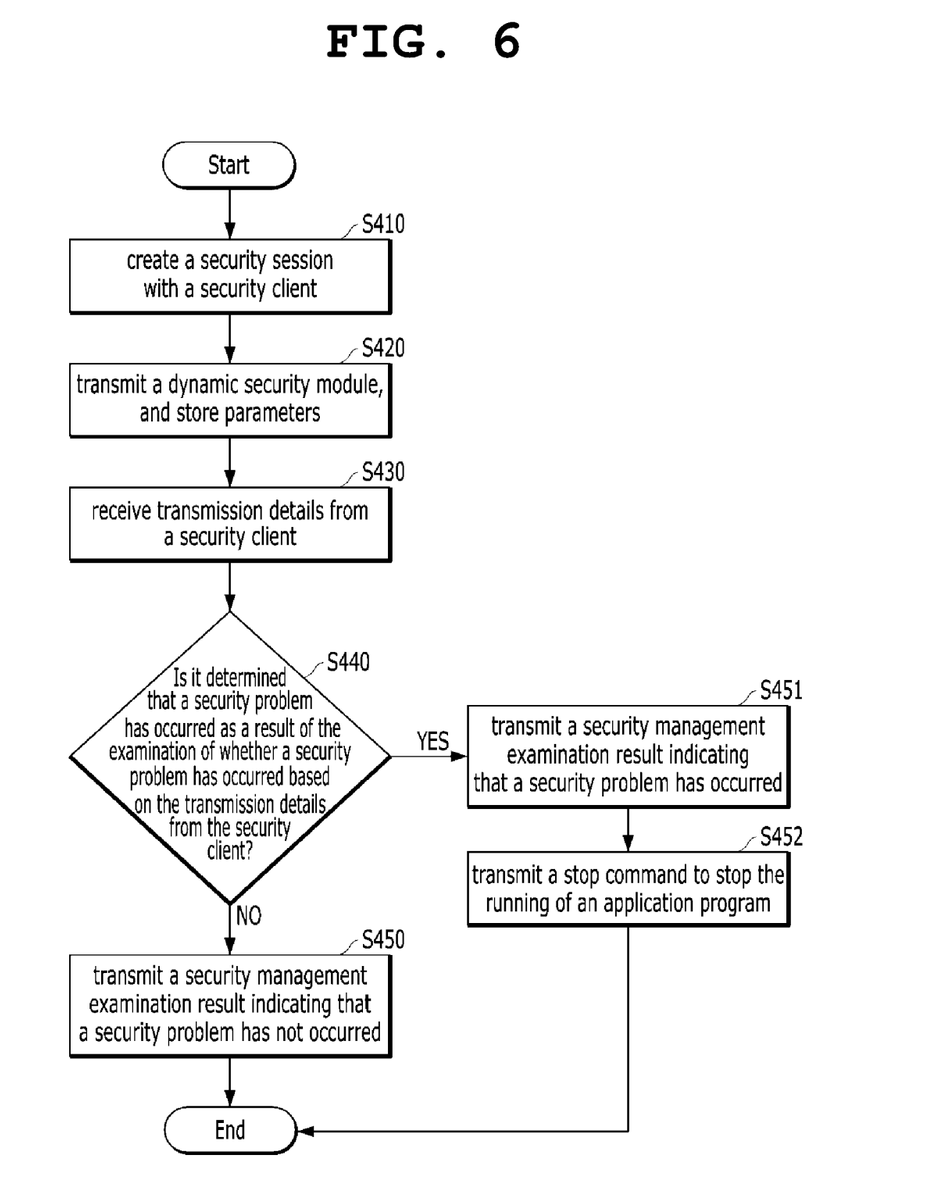
FIG. 6 is a flowchart showing a method of operating a dynamic security module server device according to a third embodiment of the present invention.

FIG. 4 is a flowchart showing a method of operating a dynamic security module server device according to a first embodiment of the present invention, FIG. 5 is a flowchart showing a method of operating a dynamic security module server device according to a second embodiment of the present invention, and FIG. 6 is a flowchart showing a method of operating a dynamic security module server device according to a third embodiment of the present invention.

Referring to these drawings, the method of operating a dynamic security module server device according to the first embodiment of the present invention is a method of operating a dynamic security module server device which transmits a dynamic security module to a user terminal and which receives a security management event from the user terminal. This method of operating a dynamic security module server device according to the first embodiment of the present invention includes: step S210 of creating a security session with the security client of the user terminal; and step S220 of transmitting the dynamic security module to the security client of the user terminal so that part or all of the code performing security management has a predetermined valid period in the security client of the user terminal in which the security session has been created.

This method of operating a dynamic security module server device further includes: step S230 of receiving security management results from the dynamic security module transmitted to the security client as security management; step S240 of determining whether a security problem has occurred by examining the received security management results; and step S250 of, when a security problem has not occurred in the user terminal, transmitting a security management examination result value indicating that a security problem has not occurred to the dynamic security module of the security client.

In this case, when a security problem has occurred in the user terminal, step S251 of transmitting a security management examination result value indicating that a security problem has occurred to the dynamic security module of the security client is performed.

Furthermore, when a security problem has occurred in the user terminal, step S252 of transmitting a stop command to stop the running of an application program of the user terminal to the dynamic security module of the security client may be further performed.

The method of operating a dynamic security module server device according to the second embodiment of the present invention is a method of operating a dynamic security module server device which transmits a dynamic security module to a user terminal and which receives a security management event from the user terminal. This method of operating a dynamic security module server device according to the first embodiment of the present invention includes: step S310 of creating a security session with the security client of a user terminal; step S320 of transmitting the dynamic security module to the security client of the user terminal so that part or all of the code performing security management has a predetermined valid period in the security client of the user terminal in which the security session has been created; step S330 of setting a predetermined valid period for the security session and transmitting information about the predetermined valid period to the dynamic security module of the security client in which the security session has been created; and step S340 of, when the security session expires due to the expiration of the predetermined valid period of the security session, transmitting a command to discard the dynamic security module to the dynamic security module or security client.

In this case, the predetermined valid period of the security session may be set to a time interval selected from the group consisting of, for example, one hour, three hours, six hours, nine hours, 12 hours, 24 hours, 48 hours, and 72 hours, and may be transmitted to the dynamic security module.

The method of operating a dynamic security module server device according to the third embodiment of the present invention is a method of operating a dynamic security module server device which transmits a dynamic security module to a user terminal and receives a security management event from the user terminal. This method of operating a dynamic security module server device according to the first embodiment of the present invention includes: step S410 of creating a security session with the security client of the user terminal; and step S420 of transmitting the dynamic security module to the security client of the user terminal so that part or all of the code performing security management has a predetermined valid period in the security client of the user terminal in which the security session has been created.

This method of operating a dynamic security module server device further includes: step S430 of, while the security session is being maintained, storing the parameters of each dynamic security module transmitted to the security client and receiving and storing the details of changes in the parameters of the dynamic security module in the security client; step S440 of determining whether a security problem has occurred based on the details of the changes in the parameters of the dynamic security module; and step S450 of, when a security problem has not occurred in the user terminal, transmitting a security management examination result value indicating that a security problem has not occurred to the dynamic security module of the security client.

In this case, when a security problem has occurred in the user terminal, step S451 of transmitting a security management examination result value indicating that a security problem has occurred to the dynamic security module of the security client is performed.

Furthermore, when a security problem has occurred in the user terminal, step S452 of transmitting a stop command to stop the running of the application program of the user terminal to the dynamic security module of the security client may be further performed.

Each of the methods of operating a dynamic security module server device according to the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software.

The dynamic security module server device and the method of operating the same according to the present invention have the advantage of transmitting dynamic security modules in each of which part or all of the code performing security management has a predetermined valid period to the security client of a user terminal, and allowing security modules for various types of application programs of the user terminal to be frequently changed, thereby making the hacking of the application programs difficult and thus significantly improving the security of the user terminal.

While the present invention has been described in conjunction with specific details, such as specific components, and limited embodiments and diagrams above, these are provided merely to help an overall understanding of the present invention. The present invention is not limited to these embodiments, and various modifications and alterations can be made based on the foregoing description by those having ordinary knowledge in the art to which the present invention pertains.

Therefore, the technical spirit of the present invention should not be determined based only on the described embodiments, and the following claims, all equivalents to the claims and equivalent modifications should be construed as falling within the scope of the spirit of the present invention.

What is claimed is:

1. A dynamic security module server device comprising:
   a transmitter to transmit a dynamic security module to a user terminal over a network;
   a receiver to receive a security management event from the user terminal over the network; and
   a processor configured to:
      create a security session with a security client of the user terminal;
      designate a first set of parameters for the dynamic security module to be used during the security session;
      change a code of the dynamic security module based on the first set of parameters;
      transmit, to the security client of the user terminal, the dynamic security module to be used during the security session;
      store the first set of parameters for the dynamic security module transmitted to the security client while the security session is being maintained;
      receive the security management event from the user terminal, wherein the security management event includes a second set of parameters of the dynamic security module that is running on the security client of the user terminal;
      verify whether the second set of parameters of the dynamic security module that is running on the security client of the user terminal match with the first set of parameters that are stored for the security session; and
      in response to detecting that the second set of parameters is different from the first set of parameters, cause the user terminal to stop running of an application program,
   wherein the first and second sets of parameters include at least one of a function name, a variable that designates an algorithm to be executed, a protocol field, a variable that designates a protocol sequence, a variable that designates a compile level, or a variable that designates an executable code obfuscation method, and wherein the security session has a predetermined valid period after which part or all of the code of the dynamic security module is changed.

2. The dynamic security module server device of claim 1, wherein the processor is further configured to:
receive security management results from the dynamic security module transmitted to the security client;
examine the received security management results; and
transmit a security management examination result to the dynamic security module of the security client.

3. The dynamic security module server device of claim 2, wherein the security management examination result comprises details of the security management that has been performed by the dynamic security module in the user terminal.

4. The dynamic security module server device of claim 1, wherein the processor is further configured to transmit a stop command to stop running of the application program of the user terminal to the dynamic security module of the security client when a security problem has occurred in the user terminal other than expiration of the predetermined valid period.

5. The dynamic security module server device of claim 1, wherein the processor is configured to create the security session by generating and storing a session ID as a security session ID and then transmitting the session ID to the security client so that the security client stores the session ID.

6. The dynamic security module server device of claim 5, further comprising a storage configured to store the dynamic security module to be transmitted to the security client of the user terminal, the session ID to be used as the security session ID, and the first set of parameters of the dynamic security module.

7. The dynamic security module server device of claim 1, wherein the security session is created with the security client of the user terminal which has been authenticated.

8. The dynamic security module server device of claim 1, wherein use of the part or all of the code is blocked when the predetermined valid period expires.

9. The dynamic security module server device of claim 1, wherein the processor is further configured to transmit a verification token proving that the dynamic security module has normally operated to an application program management server of the user terminal.

10. The dynamic security module server device of claim 1, wherein the part or all of the code is deleted when the predetermined valid period expires.

11. A method of operating a dynamic security module server device, the method comprising:
creating, with a processor, a security session with a security client of a user terminal;
designating, by the processor, a first set of parameters for a dynamic security module to be used during the security session;
changing, by the processor, a code of the dynamic security module based on the first set of parameters;

transmitting, to the security client of the user terminal, the dynamic security module to be used during the security session;
storing, by the processor, the first set of parameters for the dynamic security module transmitted to the security client while the security session is being maintained;
receiving, from the user terminal, a security management event, wherein the security management event includes a second set of parameters of the dynamic security module that is running on the security client of the user terminal;
verifying, by the processor, whether the second set of parameters of the dynamic security module that is running on the security client of the user terminal match with the first set of parameters that are stored for the security session; and
in response to detecting that the second set of parameters is different from the first set of parameters, causing the user terminal to stop running of an application program,
wherein the first and second sets of parameters include at least one of a function name, a variable that designates an algorithm to be executed, a protocol field, a variable that designates a protocol sequence, a variable that designates a compile level, or a variable that designates an executable code obfuscation method, and
wherein the security session has a predetermined valid period after which part or all of the code of the dynamic security module is changed.

12. The method of claim 11, further comprising:
receiving by the processor security management results from the dynamic security module transmitted to the security client;
examining by the processor the received security management results; and
transmitting by the processor a security management examination result to the dynamic security module of the security client.

13. The method of claim 12, wherein the security management examination result value comprises details of the security management that has been performed by the dynamic security module in the terminal device.

14. The method of claim 11, further comprising transmitting by the processor a stop command to stop running of the application program of the user terminal to the dynamic security module of the security client when a security problem has occurred in the user terminal other than expiration of the predetermined valid period.

15. The method of claim 11, wherein the security session is created by generating and storing a session ID as a security session ID and then transmitting the session ID to the security client so that the security client stores the session ID.

16. The method of claim 11, further comprising deleting by the processor the part or all of the code when the predetermined valid period expires.

17. The method of claim 11, further comprising blocking by the processor use of the part or all of the code when the predetermined valid period expires.

* * * * *